 US012309204B2

(12) United States Patent
Coleman et al.

(10) Patent No.: US 12,309,204 B2
(45) Date of Patent: May 20, 2025

(54) SPF LAYERING FOR PERFORMANT MESSAGE AUTHORIZATION ASSERTIONS

(71) Applicant: Fraudmarc Inc., Atlanta, GA (US)

(72) Inventors: Keith Wayne Coleman, Atlanta, GA (US); Richard Duncan, Atlanta, GA (US)

(73) Assignee: Fraudmarc Inc., Atlanta, GA (US)

( * ) Notice: Subject to any disclaimer, the term of this patent is extended or adjusted under 35 U.S.C. 154(b) by 109 days.

(21) Appl. No.: 17/966,719

(22) Filed: Oct. 14, 2022

(65) Prior Publication Data

US 2023/0121553 A1    Apr. 20, 2023

Related U.S. Application Data

(60) Provisional application No. 63/255,484, filed on Oct. 14, 2021.

(51) Int. Cl.
*H04L 9/40*    (2022.01)
*H04L 51/212*    (2022.01)

(52) U.S. Cl.
CPC ............ *H04L 63/20* (2013.01); *H04L 51/212* (2022.05)

(58) Field of Classification Search
CPC ...... H04L 63/20; H04L 51/212; H04L 63/101
See application file for complete search history.

(56) References Cited

U.S. PATENT DOCUMENTS

| 8,090,940 | B1 | 1/2012 | Fenton et al. |
|---|---|---|---|
| 8,392,357 | B1 | 3/2013 | Zou et al. |
| 11,019,076 | B1 | 5/2021 | Jakobsson et al. |
| 11,171,939 | B1 | 11/2021 | Blank et al. |
| 11,200,581 | B2 | 12/2021 | Williams et al. |
| 11,212,245 | B1 | 12/2021 | Ding et al. |
| 11,223,599 | B1 | 1/2022 | Mielke et al. |
| 11,349,945 | B2 | 5/2022 | Coleman et al. |
| 11,463,392 | B2 | 10/2022 | Coleman et al. |
| 11,706,178 | B2 | 7/2023 | Coleman et al. |
| 11,716,403 | B2 | 8/2023 | Coleman et al. |

(Continued)

OTHER PUBLICATIONS

S. Kitterman "Sender Policy Framework (SPF) for Authorizing Use of Domains in Email, Version 1 (RFC7208)" Apr. 1, 2014 [ retrieved on Jul. 15, 2024]. Retrieved from the internet: <URL: https://priorart.ip.com/IPCOM/000236452> (Year: 2014).*

(Continued)

*Primary Examiner* — Peter C Shaw
*Assistant Examiner* — Hany S. Gadalla
(74) *Attorney, Agent, or Firm* — BEKIARES ELIEZER LLP (57) ABSTRACT

Sender Policy Framework (SPF) is a widely used method of distinguishing authorized email from unauthorized email. SPF policies are published into a domain's DNS and then looked up and evaluated by mail receivers. Due to the complexity and limitations of the SPF specification, implementation mistakes and risks are widespread. Embodiments of the present disclosure enable new SPF techniques such as creating a top layer SPF policy for dividing addresses into categories, and multiple second layer SPF policies for identifying IP addresses corresponding to each category. One of the second layer policies is selected as a default policy, such that any IP address that does not correspond to any other of the second layer SPF policies will match the default policy.

17 Claims, 3 Drawing Sheets

(56) References Cited

U.S. PATENT DOCUMENTS

| | | |
|---|---|---|
| 12,120,079 B2 | 10/2024 | Coleman et al. |
| 2005/0144451 A1 | 6/2005 | Voice et al. |
| 2006/0031319 A1 | 2/2006 | Nelson et al. |
| 2006/0179113 A1 | 8/2006 | Buckingham et al. |
| 2008/0184366 A1 | 7/2008 | Alperovitch et al. |
| 2008/0189770 A1 | 8/2008 | Sachtjen |
| 2008/0282344 A1 | 11/2008 | Shuster |
| 2008/0307226 A1 | 12/2008 | Chow et al. |
| 2009/0147936 A1 | 6/2009 | Won et al. |
| 2010/0121928 A1 | 5/2010 | Leonard |
| 2010/0299399 A1* | 11/2010 | Wanser ............... G06Q 10/107 726/1 |
| 2013/0086187 A1 | 4/2013 | Cohen et al. |
| 2014/0181516 A1 | 6/2014 | Yoshioka |
| 2014/0215571 A1 | 7/2014 | Shuster |
| 2016/0315969 A1* | 10/2016 | Goldstein ........... H04L 63/0236 |
| 2017/0078321 A1* | 3/2017 | Maylor ................. H04L 63/08 |
| 2017/0093772 A1 | 3/2017 | Gupta |
| 2018/0227259 A1* | 8/2018 | Gupta ............... G06F 16/24566 |
| 2019/0141077 A1 | 5/2019 | Tyler et al. |
| 2019/0222608 A1 | 7/2019 | Naccarato et al. |
| 2019/0379660 A1 | 12/2019 | Thirumavalavan |
| 2020/0213332 A1 | 7/2020 | Thirumavalavan |
| 2021/0126942 A1 | 4/2021 | Fantham et al. |
| 2021/0152610 A1 | 5/2021 | Fryback et al. |
| 2021/0266294 A1 | 8/2021 | Chechik et al. |
| 2021/0289001 A1 | 9/2021 | Wilson et al. |
| 2021/0344721 A1 | 11/2021 | Coleman et al. |
| 2021/0352093 A1 | 11/2021 | Hassanzadeh et al. |
| 2022/0014543 A1 | 1/2022 | Jakobsson et al. |
| 2022/0124059 A1 | 4/2022 | Coleman et al. |
| 2022/0124165 A1 | 4/2022 | Coleman et al. |
| 2022/0294873 A1 | 9/2022 | Coleman et al. |
| 2023/0026045 A1 | 1/2023 | Coleman et al. |
| 2024/0019821 A1 | 1/2024 | Rice |
| 2024/0073296 A1 | 2/2024 | Coleman et al. |

OTHER PUBLICATIONS

U.S. Non-Final Office Action dated Jan. 12, 2022 cited in U.S. Appl. No. 17/504,423, 13 pgs.

Lars Lind Nilsson et al., "What does a "-all" do in an included (secondary) SPF record?" Super User, Retrieved Jan. 8, 2022 from https://superuser.com/questions/1167143/what-does-a-all-do-in-an-included-secondary-spf-record, Jan. 14, 2017, 4 pgs.

Hakan Lindqvist et al., "SPF with-all includes directive with ~all?" Server Fault, Retrieved January 8, 202 from https://serverfault.com/questions/848711/spf-with-all-includes-directive-with-all, May 8, 2017, 5 pgs.

Roaima et al., "Adding an SPF record for a 3rd party, but don't have one for my own domain," Server Fault, Retrieved Jan. 8, 2022 from https://serverfault.com/questions/734297/adding-an-spf-record-for-a-3rd-party-but-don't-have-one-for-my-own-domain/734308, Nov. 9, 2015, 6 pgs.

MadHatter et al., "What are SPF records, and how do I configure them?" Server Fault, Retrieved Jan. 8, 2022 from https://serverfault.com/questions/369460/what-are-spf-records-and-how-do-i-configure-them/369478#369478, Mar. 4, 2012, 7 pgs.

U.S. Final Office Action dated Apr. 27, 2022 cited in U.S. Appl. No. 17/504,423, 22 pgs.

Coleman, "Introducting Unviersal SPF," Fraudmarc, Oct. 28, 2020, https://web.archive.org/web/202010281937/https://fraudmarc.com/introducing-universal-spf/, 8 pgs.

U.S. Non-Final Office Action dated Feb. 14, 2024 cited in U.S. Appl. No. 18/362,848, 13 pgs.

* cited by examiner

FIG. 1

SPF Policies for SPF Data Layer

| Name | Data |
|---|---|
| _pass | "v=spf1 ip4:1.1.1.0/24 ip4:1.2.3.0/24 -all" |
| _fail | "v=spf1 ip4:2.56.16.0/26 <other-explicitly-blacklisted-IPs> -all" |
| _neutral | "v=spf1 ip4:130.207.0.0/16 <other-known-forwarder-IPs> ~all" |
| _softfail | "v=spf1 +all" |

SPF LAYERING FOR PERFORMANT MESSAGE AUTHORIZATION ASSERTIONS

RELATED APPLICATION

Under provisions of 35 U.S.C. § 119(e), the Applicant claims benefit of U.S. Provisional Application No. 63/255,484 filed on Oct. 14, 2021, and having inventors in common, which is incorporated herein by reference in its entirety.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to Sender Policy Framework (SPF) policies, and more specifically to layering of SPF policies.

BACKGROUND

SPF Policy Construction and Evaluation

Sender Policy Framework (SPF) policies serve as a way for authorizing domains to systematically inform message verifiers about which hosts are allowed to send mail on their behalf. Overwhelmingly, the constituent terms of SPF policies published by domain owners fall into one of two categories:
  'pass' qualified mechanisms, and
  'fail' or 'softfail' qualified all mechanism.

A 'pass' qualified mechanisms includes one or more terms that are immediately preceded by the pass qualifier (the '+' symbol). An example of explicit use of a 'pass' qualified mechanism is would be the term "+mx", which is interpreted by a standards compliant SPF evaluator to mean "pass the message if the sending host Internet Protocol (IP) address matches an IP address in an MX record associated with this domain". Mechanisms that do not explicitly include a preceding qualifier default to the 'pass' qualifier. For example, the term "mx" and the term "+mx" are evaluated in the same manner.

With relatively few exceptions, SPF policies are constructed with the intent to 'fail' unauthorized sources of messages is by including an explicit –all or ~all term, which is a catch-all term to be evaluated last when all preceding policy terms have been exhausted without a matching result. That is, the term all matches all IP addresses. The qualifier "–" indicates a fail (e.g., the –all term would fail on all IP addresses). The qualifier "~" indicates a softfail (e.g., the ~all term would softfail on all IP addresses). Throughout the approximately 14-year history of SPF policies being deployed, this has been the paradigm under which policies have been developed to facilitate message authentication for sending domains. Yet, there are nuances to email message flows that suggest alternative paradigms of policy deployments may benefit both the security and deliverability for an organization. In particular, constructing policies to better represent the confidence that an authorizing domain owner has in a message source may facilitate authentication and thus deliverability that more precisely reflects organizational intent.

DMARC-Oriented SPF Functions

The complexities of how email message authentication processes may affect deliverability are still evolving. It is evident that there exists a widespread belief that the function of an SPF policy is limited to resolving that a message passes or fails verification without any use for less-determinant assessments. Domain-based Message Authentication, Reporting and Conformance (DMARC) is an email authentication protocol designed to give email domain owners the ability to protect their domain from unauthorized use. A DMARC policy allows a domain associated with an email sender to indicate that email messages from the domain are protected by SPF and/or DomainKeys Identified Mail (DKIM), and tells a receiver what to do if a selected verification method fails. For example, the DMARC policy may instruct the receiver to reject and/or quarantine the message that does not pass verification. A DMARC policy may specify how an email receiver can report back to the sender domain about messages that pass and/or fail the verification.

In light of the DMARC paradigm of message flow monitoring and non-authenticated message delivery assertions, engineering policies to return only 'pass' or 'fail' results may not appropriately represent message trust levels. In such a two-state system, it is likely that some legitimate messages will fail SPF verification while some non-legitimate messages will pass. In fact, this complication has been one of the barriers to more widespread DMARC adoption.

DMARC-aligned SPF verification passes only when the following two conditions are met:
  Does the published SPF policy of the SMTP 5321.MailFrom domain evaluate to a 'pass'? (This is the usual SPF check without any DMARC considerations)
  Does the 5322.From message address domain align with the 5321.MailFrom domain?

Indirect message flows are problematic for SPF verification since the 5321.MailFrom address is modified to represent the message retransmitter; the consequences to this is that:
  the message is unlikely to pass SPF checks with the overwritten host domain, and
  the new host domain will not be DMARC-aligned with the message domain, and so the message will not pass DMARC on SPF alone.

In cases where messages are also DKIM-signed, the forwarding domain may preserve the attached DKIM signature so that DMARC may pass in that way. Unfortunately, there are cases where the forwarding agent modifies the message headers or body in such a way that the cryptographic signatures or hashes are changed. In these cases, DKIM verification will also fail, and thus DMARC authentication will also result in a 'fail'.

When domain owners further assert a strict enforcement DMARC policy, then these messages will not be delivered to the intended recipient. Accordingly, there is a need for SPF policies that are engineered to be less black and white for message flows that are known to be problematic (e.g., the aforementioned indirect message flows involving legitimate messages).

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Sender Policy Framework (SPF) is a widely used method of distinguishing authorized email from unauthorized email.

SPF policies are published into a domain's DNS and then looked up and evaluated by mail receivers. Due to the complexity and limitations of the SPF specification, implementation mistakes and risks are widespread. In particular, limitations of the SPF policy tend to cause users to resort to binary pass/fail checks, when more nuanced information can be provided. Embodiments of the present disclosure enable new SPF techniques such as creating a top layer SPF policy for dividing addresses into categories, and multiple second layer SPF policies for identifying IP addresses corresponding to each category. One of the second layer policies is selected as a default policy, such that any IP address that does not correspond to any other of the second layer SPF policies will match the default policy.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely to provide a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such a term to mean based on the contextual use of the term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in, the context of SPF embodiments of the present disclosure are not limited to use only in this context.

I. Overview

This overview is provided to introduce a selection of concepts in a simplified form that are further described below. This overview is not intended to identify key features or essential features of the claimed subject matter. Nor is this overview intended to be used to limit the claimed subject matter's scope.

Sender Policy Framework (SPF) is one of the most widely used methods of distinguishing electronic mail that is authorized by the purported sending domain from unauthorized mail. SPF policies are published into a domain's DNS and then looked up and evaluated by mail receivers. Due to the complexity and limitations of the SPF specification, implementation mistakes are widespread.

Embodiments of the present disclosure enable new SPF techniques such as creating a top layer SPF policy for dividing addresses into categories, and multiple second layer SPF policies for identifying IP addresses corresponding to each category. One of the second layer policies is selected as a default policy, such that any IP address that does not correspond to any other of the second layer SPF policies will match the default policy.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

SPF Policy Layering

A typical SPF policy characteristic of the current manner by which the protocol is utilized is as follows:

v=spf1 a mx include:_spf.google.com include:_spf-.someespl.com~all

The typical SPF policy, as shown above, authorizes most legitimate email, and softfails any message from a host that does not match any of the designated sender mechanism terms. The exclusive way the result of an explicit failed authorization check occurs from this operationally binary policy is to be caught by the ending "~all" term during the specified left-to-right term test progression. Generally, domain owners have not demonstrated any intent to curate source IPs specifically with robust use of SPF qualifiers. The mechanism qualifier feature of the SPF protocol is underutilized. The under-utilization may be because domain owners, not being experts in email message transmission and deliverability, are unaware that it is possible to improve message source discernment by using the qualifiers. Furthermore, existing industry SPF service providers are also not steering their clients to make use of finer-grained authorization results.

SPF layering may provide an authentication flow that is robust to authority considerations beyond the current expectation that SPF operates solely via direct term evaluation passes or all term matches for indirect fails. Since SPF evaluation occurs in a left-to-right manner, the process to refine how host sources may be tested for authorization may include a high-level operational level and one or more lower levels for data used in qualifying messages accordingly (e.g., via message source IPs or other verification input data). The top level of this framework may be a partitioning of anticipated message sources into discretized qualified sender mechanism terms. Each term of the SPF policy may be an "include", "a", or other mechanism which may use macro variables to address a separate record according to its intent. Each term may be paired with a specific SPF qualifier to communicate message authorization status to the verifying agent.

Thus, each term of a top layer policy may include a separate second-layer SPF policy for evaluation. The second-layer policy may have multiple terms, corresponding to any IP addresses to be included in the particular qualifier associated with the term of the top layer policy.

Figure 1:
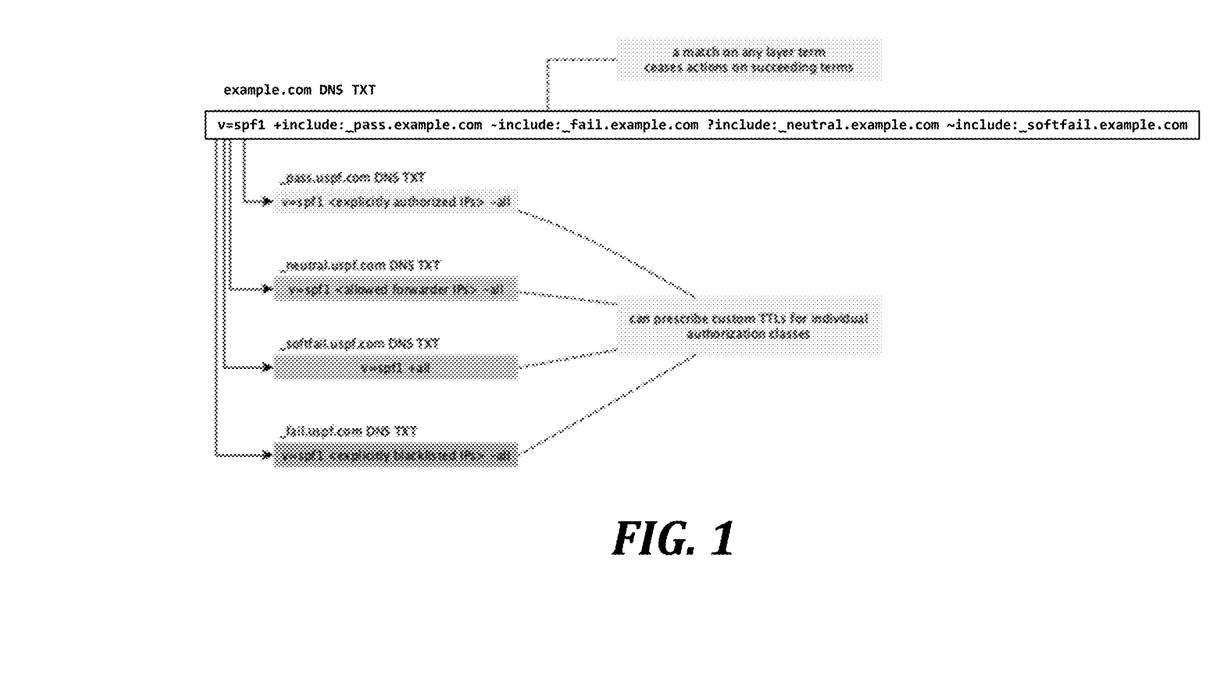
FIG. 1 illustrates an SPF schema consistent with embodiments of the present disclosure.

As an example, FIG. 1 shows a layered SPF policy, including a top layer policy and multiple second-layer (data layer) policies. The top layer policy demonstrates the various categories evaluation results (e.g., explicitly authorized, explicitly unauthorized, known message retransmitters, unrecognized users of authorized services, and/or other categories determined by the domain owner). In embodiments, the top layer policy may include a plurality of mechanisms (e.g., one mechanism for each category). Each mechanism may include a macro variable (e.g., a domain) indicating a location of a second layer policy associated with the category. Each mechanism may be associated with a qualifier, where the qualifier indicates the desired result of evaluation when an IP address matches the category. Each second layer policy may indicate a list of IP addresses the domain owner has included in a specific category. In embodiments, because each second layer policy is stored at a corresponding domain, each second layer policy may have an individually customizable TTL value. As shown in f FIG. 1, the following is an example top layer policy (note that the top layer policy is line-wrapped to fit the page):

v=spf1+include:_pass.example.com–include:_fail.example.com

?include:_neutral.example.com~include:_softfaiLexample.com

Figure 2:
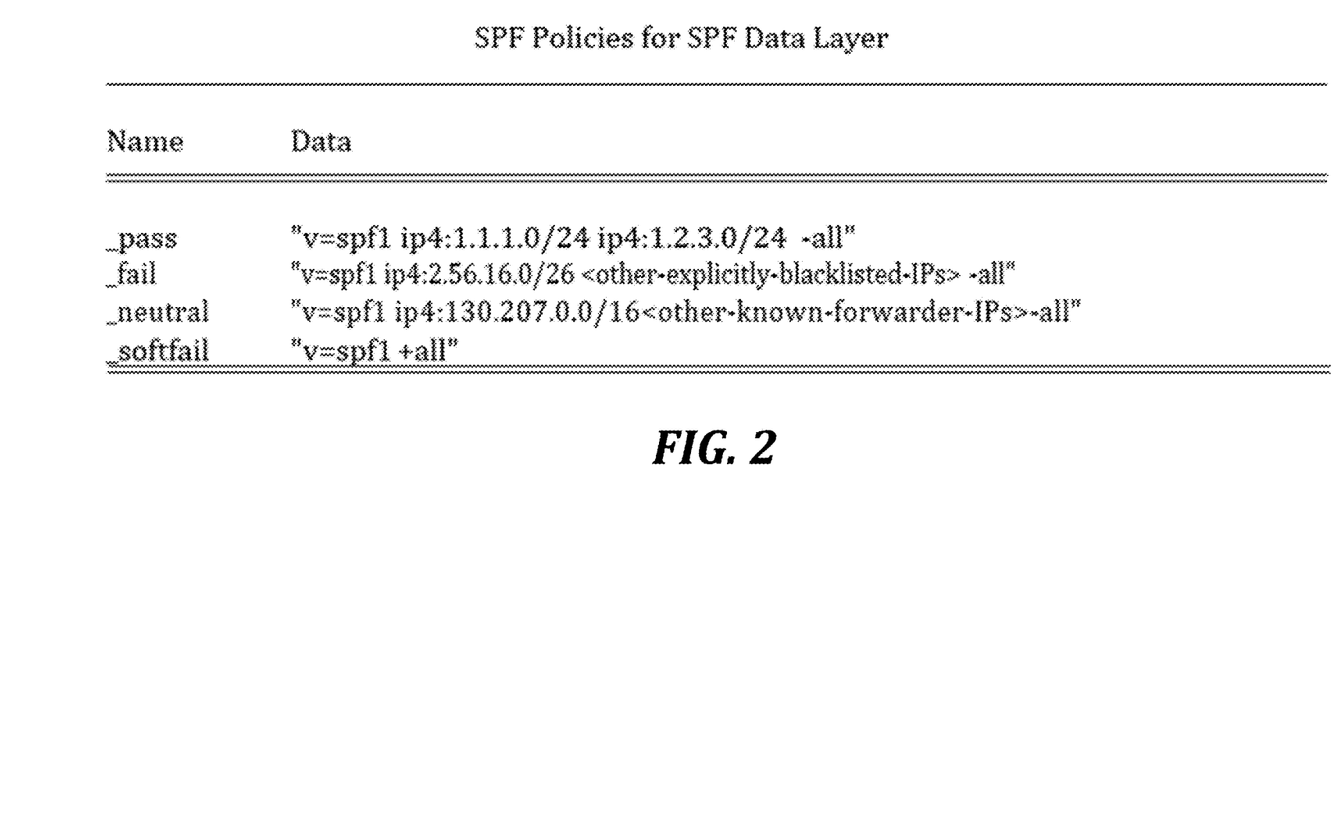
FIG. 2 illustrates a table consistent with embodiments of the present disclosure.

Here, the domain labels suggest the intent for the policies layered below each include mechanism. Example second layer policies (e.g., from the DNS TXT records associated with the domain macro variable of the term) are shown in FIG. 2. Left-to-right evaluation of the top-level policy causes evaluation of each of the second layer policies in turn, until a successful match on a top layer policy term stops testing of all terms beyond the match point.

Typically, when using include mechanism nesting to delegate, compartmentalize, or otherwise organize a set of hosts for explicit authorization (or rejection), the nested policy is endowed with a trailing "–all" or "~all" term to force (respectively) a hard- or soft-fail result upon all preceding tests within the nested policy having completed without a match. According to the SPF specification, this 'fail' result surfaces to the parent policy as a 'not match', so that the verification process will proceed to the next term in the parent layer.

As shown in FIG. 1, the top layer SPF policy does not include an "all" mechanism. Instead, one category of evaluation results is selected as a "fallback" category that includes at least a set of results that are not included in the other categories. For example, as shown in FIG. 1, the softfail category is used as the "fallback" category, and includes all IP addresses. In some embodiments, the fallback category may match all IP addresses. In other embodiments, the fallback category may list an inverse of a union of the sets of IP addresses in all other categories. In this way, it can be ensured that all IP addresses.
Example Evaluations With the set of policies Shown in FIG. 1 and the example top layer policy shown above in place, a message is evaluated based on a specific source IP address from which the message was sent with a From address of the 'example.com' domain. The top layer policy is designed to match the source IP address with exactly one of the terms in the top-level policy. In the examples below, an SPF verification process is traced for several cases. The below examples evaluate the top layer SPF policy in a left-to-right manner, compliant with SPF standards.
Source: 1.2.3.4

First, the SPF policy evaluation evaluates the first term, "+include:_pass.example.com" in the top layer SPF. Evaluation of the term "+include:_pass.example.net" causes retrieval of the second layer SPF associated with "_pass.example.com" (e.g., the _pass data of FIG. 2), and evaluation of the second layer SPF. Evaluation of the second layer SPF results in a match (e.g., as shown in FIG. 2, the term "ip4:1.2.3.0/24" in the _pass data matches the source IP address). Because the term of the top layer SPF is associated with the "+" qualifier, a match in this term causes return of a 'pass' result, as this source is explicitly authorized.

No further evaluation is done, as a match is found. The evaluation of the top layer SPF results in a 'pass'.
Source: 2.56.16.123

First, the SPF policy evaluation evaluates the first term of the top layer SPF, "+include:_pass.example.com". Evaluation of the term "+include:_pass.example.net" causes retrieval of the second layer SPF associated with "_pass.example.com" (e.g., the _pass data of FIG. 2), and evaluation of the second layer SPF. Evaluation of the second layer SPF results in no match, as this source is not explicitly authorized (e.g., the evaluation of the second layer SPF terminates with no match because evaluation reaches the term "-all" term). Accordingly, evaluation of the top layer SPF proceeds to the second term.

The SPF policy evaluation evaluates the second term of the top layer SPF, "-include:_fail.example.com". Evaluation of the term "-include:_fail.example.net" causes retrieval of the second layer SPF associated with "_fail.example.com" (e.g., the _fail data of FIG. 2), and evaluation of the second layer SPF. Evaluation of the second layer SPF results in a match (e.g., as shown in FIG. 2, the term "ip4:2.56.16.0/26" in the _fail data matches the source IP address). Because the term of the top layer SPF is associated with the "-" qualifier, a match in this term causes return of a 'fail' result, as this source is explicitly unauthorized.

No further evaluation is done, as a match is found. The evaluation of the top layer SPF results in a 'fail'.
Source: 130.207.1.2

First, the SPF policy evaluation evaluates the first term of the top layer SPF, "+include:_pass.example.com". Evaluation of the term "+include:_pass.example.net" causes retrieval of the second layer SPF associated with "_pass.example.com" (e.g., the _pass data of FIG. 2), and evaluation of the second layer SPF. Evaluation of the second layer SPF results in no match, as this source is not explicitly authorized (e.g., the evaluation of the second layer SPF terminates with no match because evaluation reaches the term "-all" term). Accordingly, evaluation of the top layer SPF proceeds to the second term.

The SPF policy evaluation evaluates the second term of the top layer SPF, "-include:_fail.example.com". Evaluation of the term "-include:_fail.example.net" causes retrieval of the second layer SPF associated with "_fail.example.com" (e.g., the _fail data of FIG. 2), and evaluation of the second layer SPF. Evaluation of the second layer SPF results in no match, as this source is not explicitly unauthorized (e.g., the evaluation of the second layer SPF terminates with no match because evaluation reaches the term "-all" term). Accordingly, evaluation of the top layer SPF proceeds to the third term.

The SPF policy evaluation evaluates the third term of the top layer SPF, "?include:_neutral.example.com". Evaluation of the term "?include:_neutral.example.net" causes retrieval of the second layer SPF associated with "_neutral.example.com" (e.g., the _neutral data of FIG. 2), and evaluation of the second layer SPF. Evaluation of the second layer SPF results in a match (e.g., as shown in FIG. 2, the term "ip4:130.207.0.0/16" in the _neutral data matches the source IP address). Because the term of the top layer SPF is associated with the "?" qualifier, a match in this term causes return of a 'neutral' result, as this source is a recognized message retransmitter.

No further evaluation is done, as a match is found. The evaluation of the top layer SPF results in a 'neutral'.
Source: 6.7.8.9

First, the SPF policy evaluation evaluates the first term of the top layer SPF, "+include:_pass.example.com". Evaluation of the term "+include:_pass.example.net" causes retrieval of the second layer SPF associated with "_pass.example.com" (e.g., the _pass data of FIG. 2), and evaluation of the second layer SPF. Evaluation of the second layer SPF results in no match, as this source is not explicitly authorized (e.g., the evaluation of the second layer SPF terminates with no match because evaluation reaches the term "-all" term). Accordingly, evaluation of the top layer SPF proceeds to the second term.

The SPF policy evaluation evaluates the second term of the top layer SPF, "-include:_fail.example.com". Evaluation of the term "-include:_fail.example.net" causes retrieval of the second layer SPF associated with "_fail.example.com" (e.g., the _fail data of FIG. 2). Evaluation of the second layer SPF results in no match, as this source is not explicitly unauthorized (e.g., the evaluation of the second layer SPF terminates with no match because evaluation reaches the term "-all" term). Accordingly, evaluation of the top layer SPF proceeds to the third term.

The SPF policy evaluation evaluates the third term of the top layer SPF, "?include:_neutral.example.com". Evaluation of the term "?include:_neutral.example.net" causes retrieval of the second layer SPF associated with "_neutral.example.com" (e.g., the _neutral data of FIG. 2) and evaluation of the second layer SPF. Evaluation of the second layer SPF results in no match, as this source is not explicitly recognized as a source of indirect mail flows (e.g., the evaluation of the second layer SPF terminates with no match because evaluation reaches the term "-all" term). Accordingly, evaluation of the top layer SPF proceeds to the fourth term.

The SPF policy evaluation evaluates the fourth term of the top layer SPF, "~include:_softfail.example.com". Evaluation of the term "~include:_softfail.example.net" causes retrieval of the second layer SPF associated with "_softfail.example.com" (e.g., the _softfail data of FIG. 2), and evaluation of the second layer SPF. Evaluation of the second layer SPF results in a match (e.g., as shown in FIG. 2, the term "+all" in the _softfail data matches the source IP address). Because the term of the top layer SPF is associated with the "~" qualifier, a match in this term causes return of a 'softfail' result.

Evaluation is complete, as a match is found. The evaluation of the top layer SPF results in a 'softfail'.

By using this more robust qualified-mechanism functionality, the authentication input space of the SPF may be effectively partitioned into distinct layers, each characteristic of the confidence a domain owner has for corresponding message sources. This input space may be characterized by sender identification through various macro fields or IP addresses that may be further associated with specific services or domains and geographical origin.

The ordering of the top-level policy terms may be relevant to the verification scheme the domain owner wishes to employ. In the example above, the match-all ("+all" term) is included on the soft failing mechanism (e.g., as part of the _softfail data of FIG. 1). In other embodiments, the soft-fail mechanism could be engineered to match on unrecognized users of authorized services, and the match all may be paired with a different qualifier (e.g., the "−" qualifier).

In effect, the SPF policy is a form of programming where the inputs are supplied by the message verifiers and the outputs are either the qualifiers or one of the error types. As such, the ubiquitous paradigm of supplying only pass-qualified mechanisms and a hard or soft failing all term is a refrain from taking advantage of a wider set of benefits available from the SPF protocol.

Examples for Signaling Neutral Results

In some cases, legitimate email messaging may suffer deliverability issues due to circumstances that are outside of the influence of the authorizing domain owner. Examples of this include (but are not limited to) indirect message flows and undesired effects of sudden perturbations in a domain's message sending patterns. In the case of indirect message flows, SPF verification often does not succeed, and DKIM results may depend on the behavior of the message retransmitter; DMARC authentication of such legitimate messaging is at the mercy of external agents and not the domain owner.

In cases where a list of known forwarders was curated from the existing email list, a domain owner could designate those sources as 'neutral' rather than strictly 'pass' or 'fail'. Thus, even when the authorizing domain is using a strict DMARC enforcement policy of p=reject, the trust in such sources could be elevated just enough for the message to not fail and, as such, have a better chance of being delivered to the intended recipient. By using macros in conjunction with the neutral-qualified mechanism, a domain owner may further assert that the softer neutral qualification is reserved for explicitly recognized users.

Examples for Signaling Soft-Fail Results

Many organizations suffer from problems with so-called "shadow IT", where legitimate agents of the organization setup unsanctioned services for one of its domains. Depending on the identity controls of an Email Service Provider (ESP), it may also be possible for someone outside of the organization to configure such a third-party account for more nefarious purposes. In either situation, it may make sense to evaluate such messages with a soft-failing mechanism.

The IP addresses of known email services may be listed under the passing mechanism, with macros in place to further resolve the originating sender. If the originating sender is not authorized, then a temporally distal soft-fail qualified mechanism may be used to match. That is, unrecognized users of authorized services should not pass authentication checks. This has benefits of protecting against compromised services that may exploit an organization's reputation for criminal or other nefarious purposes and ensuring better centralization over authorizations to use those services that would use the organization's identity in email communications, among others.

Explicitly Blacklisted IP Addresses

A message From Address is a field that is shown to the recipient in their email client software or Mail User Agent (MUA). The ease by which the From Address be forged has been an Internet-wide problem. The very low security threshold to overcome has provided a correspondingly low barrier to entry into various criminal and/or nefarious enterprises that use email messaging as an attack vector to deprive individuals and organizations of their financial and private data resources. With authentication protocols gaining adoption, especially enforcement-level DMARC, those who are intent to use the From Address vulnerability have become more selective about which domains they impersonate. Still, it is common for organizations to observe all messaging from a specific country to be entirely non-legitimate. For example, some organizations may treat 100% of messages from Chinese IP addresses as not legitimate because of the preponderance of clearly forged From Addresses.

There are organizations that maintain blacklists of IP addresses that have poor sending reputations. Not all such bad-reputation IP addresses on such lists are criminals; some are poorly-behaved sources of unwanted (e.g., spam) messaging. In either case, the list of IP addresses maintained by these organizations may be used as blacklisted IP addresses.

Hardware Implementation

The various aspects of the present disclosure may be provided by a technical platform. The platform may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform may be hosted on a centralized server, such as, for example, a cloud computing service. The various methods been described may be performed by a computing device associated with a platform. It should be understood that, in some embodiments, different operations may be performed by different networked elements in operative communication with the computing device.

This disclosure further provides one or more examples of a method of a plurality of methods that may be performed by at least one of the aforementioned modules, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device may be employed in the performance of some or all of the stages disclosed with regard to the methods.

Furthermore, although the stages of the example methods are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

The computing device may comprise a system having a memory storage and a processing unit. The processing unit coupled to the memory storage, wherein the processing unit is configured to perform the stages of the various methods herein.

Figure 3:
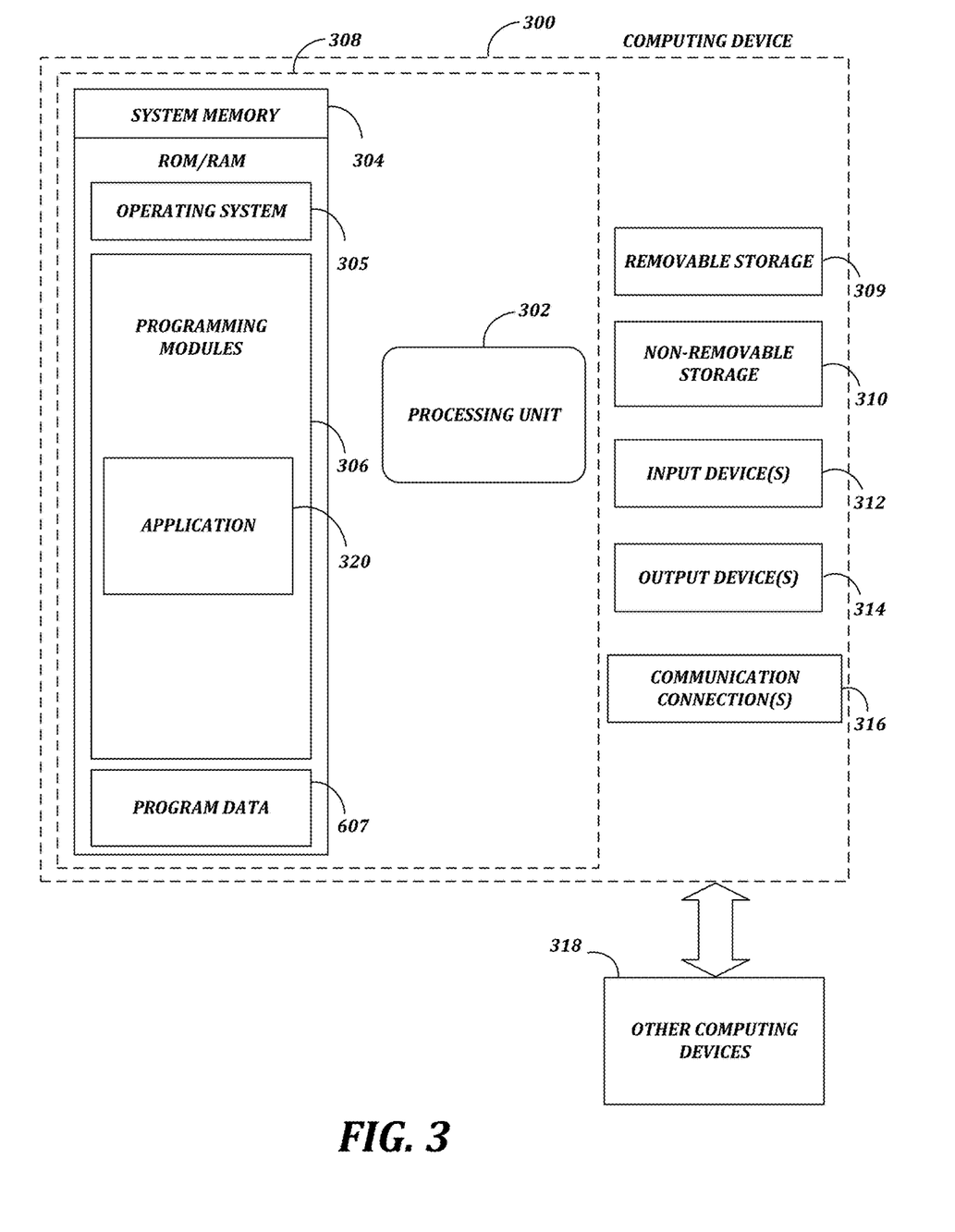
FIG. 3 is a block diagram of a system including a computing device for providing a platform consistent with embodiments of the present disclosure.

FIG. 3 is a block diagram of a system including computing device 300. Consistent with an embodiment of the disclosure, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the disclosure.

With reference to FIG. 3, a system consistent with an embodiment of the disclosure may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include a program data 307. Operating system 305, for example, may be suitable for controlling computing device 300's operation. In one embodiment, programming modules 306 may include an SPF policy controller configured to create, modify, or remove SPF policies on behalf of its users. Furthermore, embodiments of the disclosure may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g., SPF controller application 320) may perform processes including, for example, one or more of the methods as described above. The aforementioned process is an example, and processing unit 302 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and other form of solid state storage. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or an optical drive, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

II. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method comprising:
generating a Sender Policy Framework (SPF) policy; wherein the SPF policy comprises:
a top layer SPF policy comprising a plurality of terms, each term of the plurality of terms corresponding to a category of a plurality of categories, and
a plurality of second layer SPF policies, each second layer SPF policy corresponding to a particular category, of the plurality of categories, wherein each second layer SPF policy indicates a set of IP addresses in the particular category; and
applying the generated SPF policy to an IP address of a source of a received email message to determine a qualifier associated with the received email message;
wherein each term, of the plurality of terms, comprises:
an SPF mechanism;
an SPF qualifier; and
a reference to a particular one of the plurality of second layer SPF policies; and
wherein the plurality of second layer SPF policies includes a default second layer policy, and wherein the set of IP addresses indicated by the default second layer policy corresponds to one of the following:
a set of all IP addresses, or
an inverse of a union of IP addresses indicated in all other second layer SPF policies.

2. The method of claim 1, wherein the SPF mechanism comprises one of the following:
an "a" mechanism, or
an "include" mechanism.

3. The method of claim 1, wherein each qualifier is selected from one of the following:
a pass qualifier,
a neutral qualifier,
a softfail qualifier, or
a fail qualifier.

4. The method of claim 3, wherein each term of the plurality of terms comprises a unique qualifier.

5. The method of claim 1, wherein the default second layer SPF policy corresponds to a right-most term in the top layer SPF policy.

6. The method of claim 1, wherein each of the second layer SPF policies is stored at a unique domain.

7. A method comprising:
publishing a Sender Policy Framework (SPF) policy;
wherein the SPF policy comprises:
  a top layer SPF policy comprising a plurality of terms, each term of the plurality of terms corresponding to a category of a plurality of categories, and
  a plurality of second layer SPF policies, each second layer SPF policy corresponding to a particular category, of the plurality of categories, wherein each second layer SPF policy indicates a set of IP addresses in the particular category; and
applying the published SPF policy to an IP address of a source of a received email message to determine a qualifier associated with the received email message;
wherein each term, of the plurality of terms, comprises:
  an SPF mechanism;
  an SPF qualifier; and
  a reference to a particular one of the plurality of second layer SPF policies; and
wherein the plurality of second layer SPF policies includes a default second layer policy, and wherein the set of IP addresses indicated by the default second layer policy corresponds to one of the following:
  a set of all IP addresses, or
  an inverse of a union of IP addresses indicated in all other second layer SPF policies.

8. The method of claim 7, wherein the SPF mechanism comprises one of the following:
  an "a" mechanism, or
  an "include" mechanism.

9. The method of claim 7, wherein each qualifier is selected from one of the following:
  a pass qualifier,
  a neutral qualifier,
  a softfail qualifier, or
  a fail qualifier.

10. The method of claim 9, wherein each term of the plurality of terms comprises a unique qualifier.

11. The method of claim 7, wherein the default second layer SPF policy corresponds to a right-most term in the top layer SPF policy.

12. The method of claim 7, wherein each of the second layer SPF policies is stored at a unique domain.

13. A method comprising:
providing a top layer Sender Policy Framework (SPF) policy for inclusion in an SPF policy;
wherein providing the top layer SPF policy comprises providing a plurality of terms, each term of the plurality of terms corresponding to a category of a plurality of categories, and wherein each term, of the plurality of terms, comprises:
  an SPF mechanism;
  an SPF qualifier; and
  a reference to a particular one of a plurality of second layer SPF policies;
wherein each second layer SPF policy indicates a set of IP addresses in a particular category of the plurality of categories;
wherein the plurality of second layer SPF policies includes a default second layer policy, and wherein the set of IP addresses indicated by the default second layer policy corresponds to one of the following:
  a set of all IP addresses, or
  an inverse of a union of IP addresses indicated in all other second layer SPF policies and
applying the provided top-layer SPF policy to an IP address of a source of a received email message to determine a qualifier associated with the received email message.

14. The method of claim 13, wherein the SPF mechanism comprises one of the following:
  an "a" mechanism, or
  an "include" mechanism.

15. The method of claim 13, wherein each qualifier is selected from one of the following:
  a pass qualifier,
  a neutral qualifier,
  a softfail qualifier, or
  a fail qualifier.

16. The method of claim 15, wherein each term of the plurality of terms comprises a unique qualifier.

17. The method of claim 13, wherein the default second layer SPF policy corresponds to a right-most term in the top layer SPF policy.

* * * * *